United States Patent
Bisping et al.

(10) Patent No.: US 6,712,572 B2
(45) Date of Patent: Mar. 30, 2004

(54) EXPANSION DOWEL

(75) Inventors: Heinz Bisping, Augsburg (DE); Alois Kölbl, Buchloe (DE); Jürgen Wieser, Kaufering (DE); Claudia Zimmerer, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/194,559

(22) Filed: Jul. 12, 2002

(65) Prior Publication Data

US 2003/0017024 A1 Jan. 23, 2003

(30) Foreign Application Priority Data

Jul. 17, 2001 (DE) .......................................... 101 34 605

(51) Int. Cl.[7] ................................................ F16B 13/06
(52) U.S. Cl. ........................................ 411/60.1; 411/65
(58) Field of Search .................. 411/60.1, 55, 60.2, 411/63, 64, 65, 57.1, 45

(56) References Cited

U.S. PATENT DOCUMENTS

| | | | | |
|---|---|---|---|---|
| 1,248,007 A | * | 11/1917 | Pleister | 411/63 |
| 1,625,013 A | * | 4/1927 | Zifferer | 411/68 |
| 4,246,688 A | * | 1/1981 | Risdon | 29/426.5 |
| 4,482,277 A | * | 11/1984 | Schiefer | 411/42 |
| 4,702,349 A | * | 10/1987 | Zenhausern | 182/90 |
| 5,156,507 A | * | 10/1992 | Underbrink | 411/63 |

* cited by examiner

*Primary Examiner*—Heather Shackelford
*Assistant Examiner*—Lisa M. Saldano
(74) *Attorney, Agent, or Firm*—Sidley Austin Brown & Wood, LLP

(57) ABSTRACT

An expansion dowel having a cylindrical expansion body (1) having a through-bore (3) and formed of at least two segments (4a, 4b) connected with each other, an additional expansion element (7) located in a recess (8) formed in an outer profile (6) of the expansion member (1) and having a radial depth of the recess (8) diminishing in a setting direction (S) of the expansion dowel; the additional expansion element (7) having a radial extent at least partially greater than a maximal dept of the recess (8).

7 Claims, 2 Drawing Sheets

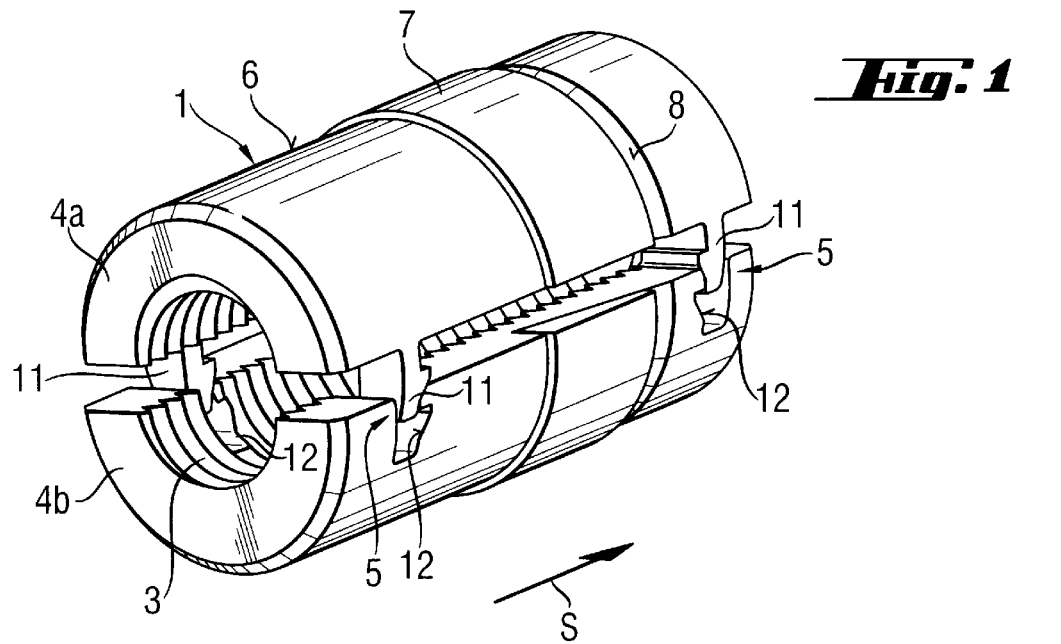
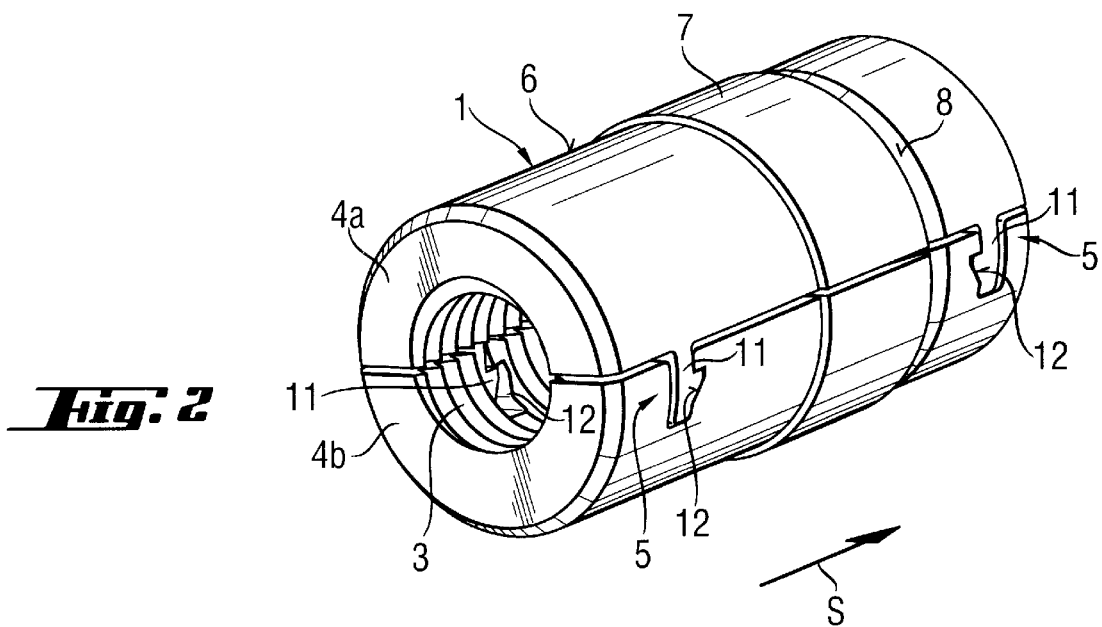

EXPANSION DOWEL

BACKGROUND OF THE INVENTION

1. Field of the Invention

The present invention relates to an expansion dowel including a cylindrical expansion body formed of at least two segments and having a through-bore with an inner shaped profile, and a recess formed in an outer profile of the expansion member with a radial depth of the recess diminishing in a setting direction of the expansion dowel; and an additional expansion element located in the recess and having a radial extent at least partially greater than a maximal depth of the recess.

2. Description of the Prior Art

Expansion dowels of the type described above have many applications and are used in particular as drive-in dowels for being set in constructional components formed, e.g., of concrete. When a drive-in dowel is to be set in a constructional component, first, a bore is formed in the constructional component into which the drive-in dowel is to be driven, and then the dowel is driven-in, e.g., with a percussion power tool. For expanding the dowel in the core, a bolt, which also serves as load application means, is inserted or is driven-in into the bore of the dowel in a setting direction. Preferably, the diameter of the bolt is substantially the same as the diameter of the through-bore of the expansion body of the dowel.

An expansion dowel of the type described above is disclosed in a German Utility Model DE-75 38457. The known expansion dowel has an expansion body formed of a plurality of segments hingedly connected with each other.

A drawback of the known expansion dowel consists in that the setting process is rather unwieldy because during the setting process the expansion body is not fixedly mounted on the load application means, e.g., on a bolt having a shaped outer profile.

OBJECT OF THE INVENTION

Accordingly, an object of the present invention is to provide an expansion dowel having a segmented expansion body and which can be easily handled.

Another object of the present invention is to provide an expansion dowel having a segmented expansion body and capable of withstanding of high loads.

A further object of the present invention is to provide an expansion dowel having a segmented expansion body and which can be economically produced.

SUMMARY OF THE INVENTION

These and other objects of the present invention, which will become apparent hereinafter, are achieved by providing connection elements for connecting adjacent segments of the expansion body.

The connection of the adjacent segments, the expansion body is formed of, makes it possible to preassemble the dowel with load application means. If, e.g., an anchor rod is used as load application means, the connection elements, the separate segments are connected with, insure that the expansion dowel is mounted on the anchor rod without a possibility of an axial displacement therealong. The fixed mounting of the expansion dowel on the anchor rod frees the user from holding the dowel during the setting process. Further, the connection of the separate segments of the expansion body with the connection elements insures an exact positioning of the dowel on the anchor rod or the like during the setting process. Advantageously, all of the segments, which form the expansion body, are connected with each other by respective connection elements.

Advantageously, in order to provide for a reliable and economical connection of the expansion body-forming segments, the connection elements are formed so that they insure a snap connection of the segments with each other. In a preferred embodiment, the connection elements are so formed that they provide for a releasable snap connection of the segments. Naturally, instead of the snap connection, other forms of connection can be used such as, e.g., friction connection, chemical connection, etc.

Advantageously, the connection elements includes at least one hook-shaped element provided on at least one segment and a recess provided in another segment and in which the hook-shaped element engages, with formation of a form-locking connection between the connection elements. The use of the hook-shaped element and the recess insures, on one hand, economical formation of the connection elements and, on the other hand, obtaining a form-locking connection of the adjacent segments. A releasable connection is obtained by appropriate shaping of the hook-shaped element and the recess.

The segments are advantageously formed as semicircular shells, which permits to obtain a two-part expansion body that is easy to handle.

Preferably, the segments and the additional expansion element are formed of a plastic material.

When, e.g., the dowel needs to meet particular requirements, e.g., be fire-resistant, the segments and the additional expansion element are formed of metal.

According to a particularly advantageous embodiment of the present invention, the segments and the additional expansion element are formed of metal covered with plastics, using an injection-molding process. This insures easy manufacturing of the inventive dowel. Thereby it is insured that the connection elements, e.g., snap connection elements, can be easily provided on respective segments by the injection-molding process when the plastics is applied to the segments.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

In the Drawings:

FIG. 1 shows a perspective view of a segmented expansion dowel with non-connected segments;

FIG. 2 shows a perspective view of the expansion dowel shown in FIG. 1 with connected segments.

DETAILED DESCRIPTION OF THE PREFERRED EMBODIMENT

Figure 3:
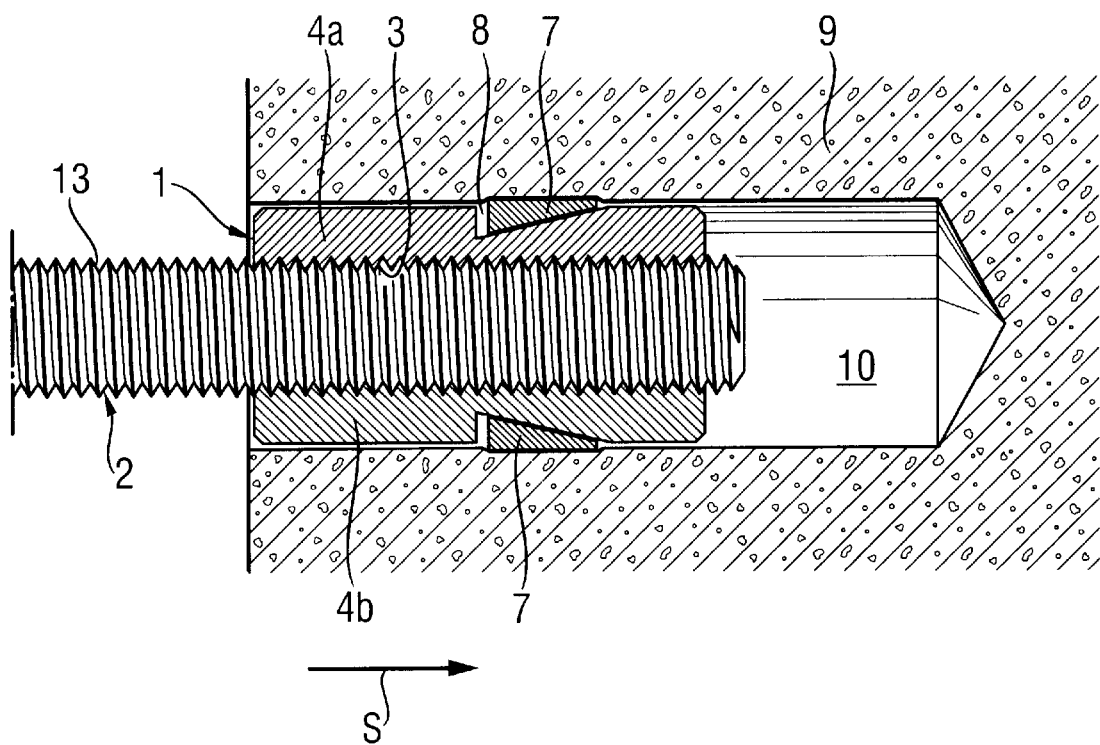
FIG. 3 shows a longitudinal cross-sectional view of the expansion dowel shown in FIG. 1 in its set condition.

A segmented expansion dowel according to the present invention, which is shown in FIGS. 1–3, is formed as a cylindrical expansion body 1 having an axially extending through-bore 3 and a recess 8 in which an additional expansion element 7 is arranged.

The expansion body 1 is formed of two segments 4a and 4b which are hingedly connected by connection means 5. The recess 8 is formed as an axially extending wedge-shaped recess and is formed approximately in the middle of the expansion body 1. The wedge-shaped recess 8 extends over an entire circumference of an outer profile 6 of the expansion body 1. The wedge-shaped recess 8 is so formed that its radial depth diminishes in a setting direction S of the expansion dowel, as it can clearly be seen in FIG. 3. As a result, the wedge-shaped recess has a large width at its end facing in a direction opposite to the setting direction S. The end, which faces in the direction opposite the setting direction, also serves as a stop limiting the displacement of the additional expansion element 7 in the direction opposite the setting direction S. The bore 3 of the expansion body 1 has a shaped profile in form, e.g., of an inner thread.

The additional expansion element 7 has a wedge-shaped cross-section complementary to the wedge-shaped contour of the recess 8. As a maximal radial dimension of the additional expansion element 7 is somewhat larger than the maximal depth of the wedge-shaped recess 8, the additional expansion member 7 projects radially beyond the expansion body 1.

The connection means 5 is formed as snap-connection means that includes hook elements 11 provided in one segment 4a, and complementary recesses 12 provided in the other segment 4b and in which the hook elements 11 engage. FIG. 1 shows the expansion dowel in an open condition in which the hook elements 11 do not engage in the recesses 12. In FIGS. 2 and 3, the expansion dowel is shown in its closed condition in which the hook elements.

FIG. 3 shows the expansion dowel according to the present invention in a set condition in which the dowel is set in a bore 10 formed in a constructional component 9. A bolt 2, which forms a load application element, is inserted into the bore 3 of the expansion body 1 for expanding the expansion body 1 and, thus, the bolt 2 is used as an expansion member. Due to the wedge or conical shape of the recess, upon application to the bolt 2 of a load acting in the direction opposite the setting direction S, a secondary expansion takes place. Preferably, the bolt 2 has a shaped outer profile 13, e.g., in form of an outer thread, whereby a form-locking connection is formed between the bolt 2 and the expansion member 1 upon the bolt 2 being screwed into the through-bore 3 of the expansion body 1.

During the setting process, the segments 4a and 4b are so pressed against the bolt 2 that they engage the bolt 2 over its entire circumference. Due to pressing the two segments, 4a, 4b toward each other, one hand, the hook elements 11 engage in the recesses 12, as shown in FIG. 2 (without a bolt being inserted into the through-bore 3), and on the other hand, the inner shaped profile of the bore 3 engages the outer shaped profile 13 of the bolt 2. The engagement of the inner-shaped profile of the-bore 3 with the outer shaped profile-of the bolt 2 provides a form-locking connection between the expansion body 1 and the bolt 2. After the connection of the bolt 2 with the expansion body 1, the dowel, together with the bolt 2, is inserted into the bore 10. When a load, which is applied to the bolt 21 acts in the direction opposite the setting direction S, the additional expansion element 7 insures that the dowel, i.e., the expansion body 1, is wedged in the bore 10.

Though the present invention was shown and described with references to the preferred embodiment such is merely illustrative of the present invention and is not to be construed as a limitation thereof, and various modifications to the present invention will be apparent to those skilled in the art. It is, therefore, not intended that the present invention be limited to the disclosed embodiments or details thereof, and the present invention includes all of variations and/or alternative embodiments within the spirit and scope of the present invention as defined by the appended claims.

What is claimed is:

1. An expansion dowel, comprising a cylindrical expansion body (1) formed of at least two segments (4a, 4b) and having a through-bore (3) with an inner shaped profile, and a recess (8) formed in an outer profile (6) of the expansion body (1) with a radial depth of the recess (8) diminishing in a setting direction (S) of the expansion dowel; an additional expansion element (7) located in the recess (8) and having a radial extent at least partially greater than a maximal depth of the recess (8); and means (11, 12) for connecting the at least two segments (4a, 4b) with each other.

2. An expansion dowel according to claim 1, where the connection means comprises snap-connection means.

3. An expansion dowel according to claims 1, wherein the connection means (11, 12) comprises at least one hook-shaped element (11) provided on one of the at least two segments (4a) and a recess (12) provided in another of the at least two segments (4b) and in which the hook-shaped element engages.

4. An expansion dowel according to claim 1, wherein the at least two segments (4a, 4b) are formed as semicircular shell.

5. An expansion dowel according to claim 1, wherein the segments (4a, 4b) and the additional expansion element (7) are formed of a plastic material.

6. An expansion dowel according to claims 1, wherein the segments (4a, 4b) and the additional expansion element (7) are formed of metal.

7. An expansion dowel according to claims 1, wherein the segments (4a, 4b) and the additional expansion element (7) are formed of metal and are covered by a plastic material.

* * * * *